US012662341B2

(12) United States Patent
Mikashima

(10) Patent No.: US 12,662,341 B2
(45) Date of Patent: Jun. 23, 2026

(54) RECORDING MEDIUM CONVEYANCE DEVICE AND IMAGE FORMING SYSTEM

(71) Applicant: KYOCERA Document Solutions Inc., Osaka (JP)

(72) Inventor: Katsuo Mikashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 116 days.

(21) Appl. No.: 18/807,420

(22) Filed: Aug. 16, 2024

(65) Prior Publication Data

US 2025/0066149 A1 Feb. 27, 2025

(30) Foreign Application Priority Data

Aug. 25, 2023 (JP) ................................ 2023-136707

(51) Int. Cl.
*B41J 11/42* (2006.01)
*B41J 11/00* (2006.01)
*B65H 7/06* (2006.01)

(52) U.S. Cl.
CPC .............. *B65H 7/06* (2013.01); *B41J 11/002* (2013.01); *B41J 11/42* (2013.01); *B65H 2553/80* (2013.01)

(58) Field of Classification Search
None
See application file for complete search history.

(56) References Cited

U.S. PATENT DOCUMENTS

| | | | | |
|---|---|---|---|---|
| 4,579,334 A * | 4/1986 | Durajczyk | G07D 7/164 | 271/263 |
| 7,997,677 B2 * | 8/2011 | Navazo | B41J 11/0035 | 347/17 |
| 9,309,074 B1 * | 4/2016 | Bonino | B65H 9/08 | |
| 2003/0141653 A1 * | 7/2003 | Kumamoto | G07D 7/164 | 271/262 |
| 2022/0308500 A1 * | 9/2022 | Matsumoto | B41J 11/007 | |

FOREIGN PATENT DOCUMENTS

JP 2001-026154 A 1/2001

* cited by examiner

*Primary Examiner* — Leslie J Thompson
(74) *Attorney, Agent, or Firm* — Stein IP, LLC

(57) ABSTRACT

A recording medium conveyance device includes a recording medium conveyance unit, a detecting member, a voltage application unit, and a control unit. The recording medium conveyance unit conveys a recording medium. The detecting member is disposed to face the recording medium conveyance unit with a predetermined interval therebetween. The voltage application unit applies a detection voltage between the recording medium conveyance unit and the detecting member. The control unit controls the recording medium conveyance unit and the voltage application unit. When the recording medium conveyance unit conveys the recording medium, the control unit controls the voltage application unit to apply the detection voltage, detects contact between the recording medium and the detecting member, on the basis of a change in the detection voltage with respect to a predetermined threshold value, and determines conveyance abnormality of the recording medium.

10 Claims, 7 Drawing Sheets

RECORDING MEDIUM CONVEYANCE DEVICE AND IMAGE FORMING SYSTEM

INCORPORATION BY REFERENCE

This application is based upon and claims the benefit of priority from the corresponding Japanese Patent Application No. 2023-136707 filed Aug. 25, 2023, the entire contents of which are hereby incorporated by reference.

BACKGROUND

The present disclosure relates to a recording medium conveyance device and an image forming system.

As an image forming apparatus such as a printer or a copier, an inkjet recording device is widely used, which ejects ink to a recording medium such as paper so as to record an image, because it can record a high definition image.

This inkjet recording device is equipped with a recording head that ejects ink to the recording medium that is conveyed, a heating unit that heats and dries the recording medium with the ejected ink, and the like. In order to maintain image quality and productivity related to image recording, a very small distance (interval) is set between the recording medium and the recording head as well as the heating unit. For this reason, it is necessary to detect a recording medium having conveyance abnormality in which a rise has occurred due to curling or bending in an image recording region by the recording head or a drying region of the recording medium by the heating unit, and to prevent the recording medium from entering.

SUMMARY

A recording medium conveyance device according to one aspect of the present disclosure includes a recording medium conveyance unit, a detecting member, a voltage application unit, and a control unit. The recording medium conveyance unit conveys a recording medium. The detecting member is disposed to face the recording medium conveyance unit with a predetermined interval therebetween. The voltage application unit applies a detection voltage between the recording medium conveyance unit and the detecting member. The control unit controls the recording medium conveyance unit and the voltage application unit. When the recording medium conveyance unit conveys the recording medium, the control unit controls the voltage application unit to apply the detection voltage, detects contact between the detecting member and the recording medium on the basis of a change in the detection voltage with respect to a predetermined threshold value, and determines conveyance abnormality of the recording medium.

DETAILED DESCRIPTION

Hereinafter, an embodiment of the present disclosure is described with reference to the drawings. Note that the present disclosure is not limited to the following description.

Figure 1:
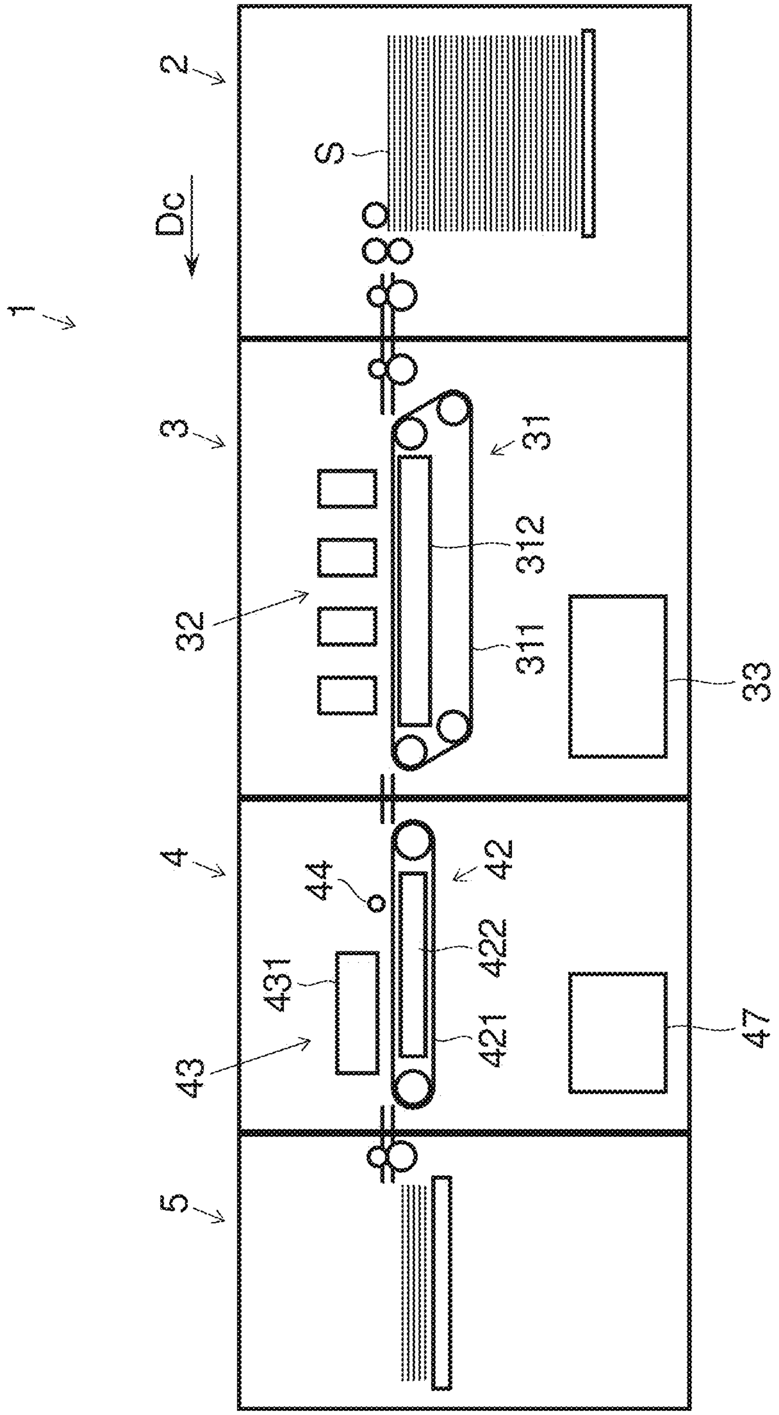
FIG. 1 is a schematic cross-sectional front view of an image forming system according to one embodiment of the present disclosure.

FIG. 1 is a schematic cross-sectional front view of an image forming system 1 of the embodiment. As illustrated in FIG. 1, the image forming system 1 includes a paper sheet feeding device 2, an image forming apparatus 3, a drying device (recording medium conveyance device) 4, and a paper sheet discharging device 5.

In the image forming system 1, the paper sheet feeding device 2 is disposed in the most upstream part in a paper sheet conveying direction Dc. The paper sheet feeding device 2 stores a plurality of paper sheets (recording media) S, and separates and sends out the paper sheets S one by one when recording.

The image forming apparatus 3 is connected to a downstream side of the paper sheet feeding device 2 in the paper sheet conveying direction Dc of the image forming system 1. The image forming apparatus 3 is an inkjet recording type image forming apparatus, for example. The image forming apparatus 3 includes a belt conveyance unit 31, a recording unit 32, and a recording control unit 33.

The belt conveyance unit 31 includes an endlessly formed conveyor belt 311 and a paper sheet suction unit 312. The conveyor belt 311 has a plurality of holes penetrating the front and back surfaces (not shown). The paper sheet suction unit 312 is disposed adjacent to the upper part of the conveyor belt 311 inside the loop of the conveyor belt 311. The upper surface of the paper sheet suction unit 312 is provided with a suction section (not shown) constituted of a plurality of holes, which suck air downward.

The belt conveyance unit 31 sucks and holds the paper sheet S on the upper surface of the conveyor belt 311 by the paper sheet suction unit 312, so as to convey the same. The belt conveyance unit 31 is disposed below the recording unit 32, so as to face the recording unit 32, and conveys the paper sheet S received from the paper sheet feeding device 2.

The recording unit 32 is disposed to face the belt conveyance unit 31. The recording unit 32 faces the paper sheet S that is sucked and held on the upper surface of the conveyor belt 311 and is conveyed by the same, and is disposed above the conveyor belt 311 with a predetermined interval between them.

Figure 2:
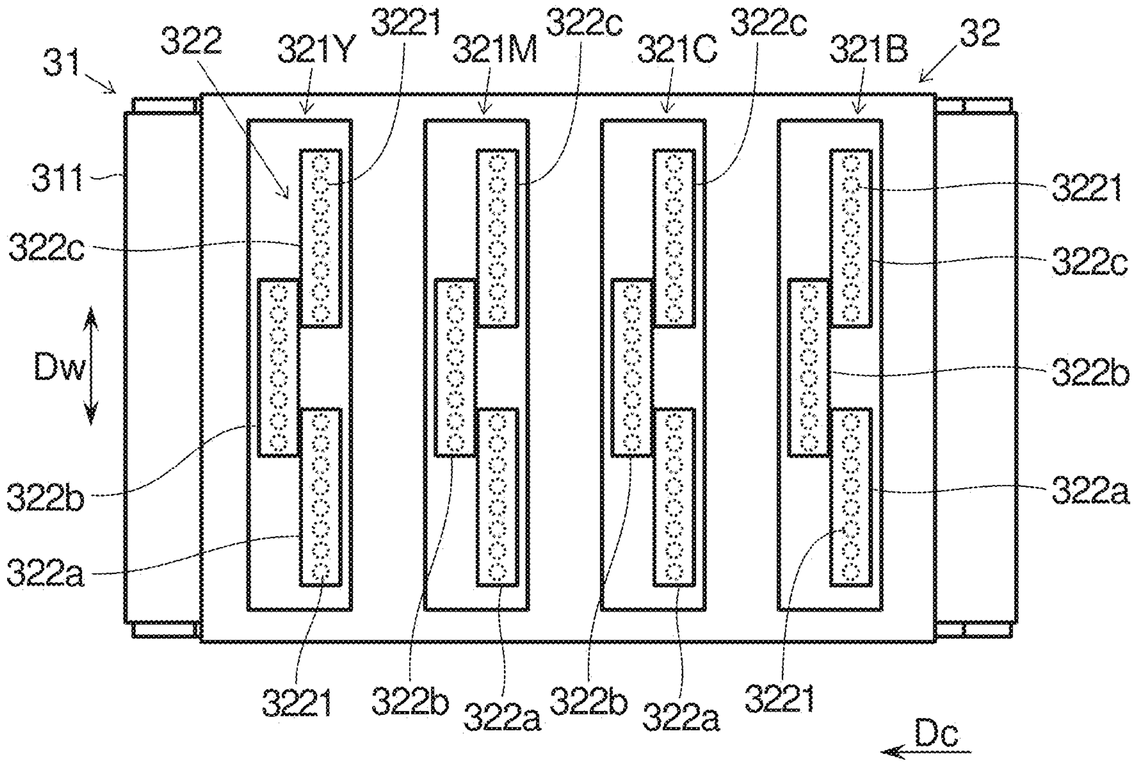
FIG. 2 is a plan view of a recording unit and its vicinity of the image forming apparatus illustrated in FIG. 1.

FIG. 2 is a plan view of the recording unit 32 and its vicinity of the image forming apparatus 3 illustrated in FIG.

1. As illustrated in FIG. 2, the recording unit 32 includes head units 321B, 321C, 321M, and 321Y corresponding to black, cyan, magenta, and yellow colors, respectively. The head units 321B, 321C, 321M, and 321Y are arranged side by side along the paper sheet conveying direction Dc, in such a manner that their longitudinal directions are parallel to a paper sheet width direction Dw perpendicular to the paper sheet conveying direction Dc. Note that the four head units 321B, 321C, 321M, and 321Y have the same basic structure, and the suffixes "B", "C", "M", and "Y" indicating colors may be omitted in the following description, unless specification is necessary.

The head unit 321 of each color has a line type inkjet recording head 322. In the head unit 321 of each color, the recording head 322 includes a plurality of (e.g. three) heads 322*a*, 322*b*, and 322*c* arranged in a zigzag shape along the paper sheet width direction Dw.

The recording head 322 has a plurality of ink ejection nozzles 3221 formed at the bottom part. The plurality of ink ejection nozzles 3221 are arranged along the paper sheet width direction Dw, so that ink can be ejected over the entire recording region on the paper sheet S. The recording unit 32 ejects ink sequentially from the recording heads 322 of the head units 321B, 321C, 321M, and 321Y of four colors, to the paper sheet S that is conveyed by the conveyor belt 311, so as to record a full color image or a monochrome image on the paper sheet S.

The recording control unit 33 includes a CPU, a storage unit, and other electronic circuits and components (which are not shown). The CPU controls operations of individual components of the image forming apparatus 3, on the basis of a control program and data stored in the storage unit, so as to perform processes related to functions of the image forming apparatus 3. The belt conveyance unit 31 and the recording unit 32 each receive instructions separately from the recording control unit 33, and work in a synchronous manner, so as to perform recording on the paper sheet S. The storage unit is constituted of a combination, for example, of a nonvolatile storage device such as a program read only memory (ROM) and a data ROM, and a volatile storage device such as a random access memory (RAM). The image forming apparatus 3 records an image on the paper sheet S.

Note that the recording control unit 33 may send and receive information from each of the paper sheet feeding device 2, the drying device 4, and the paper sheet discharging device 5, and may send instructions to the devices separately, so as to integrally manage and control the entire image forming system 1.

With reference to FIG. 1 again, the drying device 4 is connected to a downstream side of the image forming apparatus 3 in the paper sheet conveying direction Dc of the image forming system 1. The drying device 4 includes a paper sheet conveyance unit (recording medium conveyance unit) 42 and a heating unit 431. The paper sheet S, on which an ink image has been recorded in the image forming apparatus 3, is conveyed in the drying device 4 while being sucked and held by the paper sheet conveyance unit 42, and the ink is dried during the conveyance. A detailed structure of the drying device 4 will be described later.

The paper sheet discharging device 5 is connected to a downstream side of the drying device 4 in the paper sheet conveying direction Dc of the image forming system 1. The paper sheet S, whose ink has been dried in the drying device 4 to complete recording (printing), is conveyed to the paper sheet discharging device 5. In the paper sheet discharging device 5, the printed paper sheet (printed matter) is taken out from above, from the side face, or the like.

Figure 3:
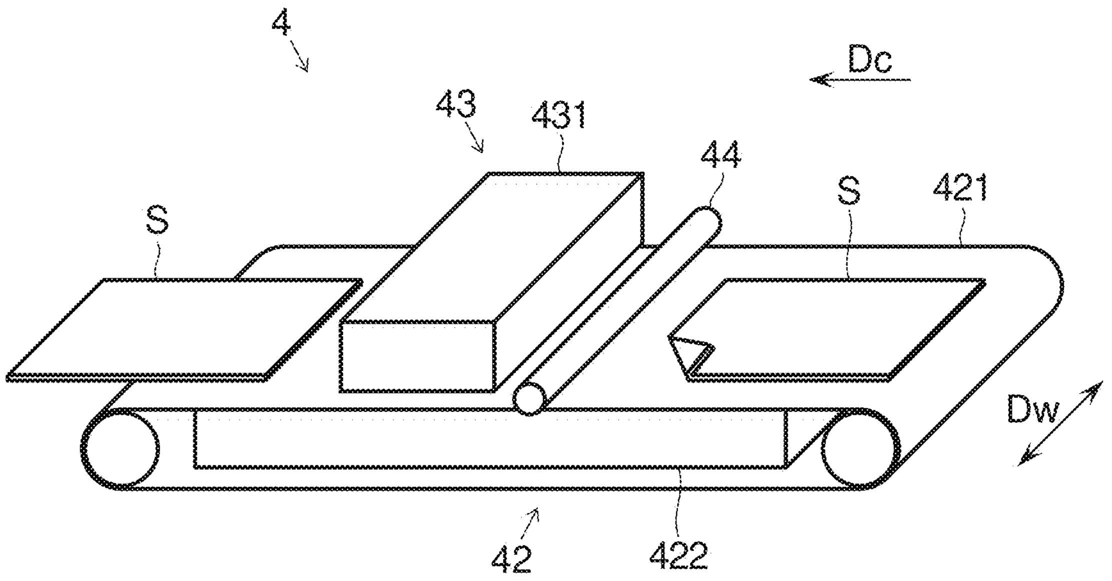
FIG. 3 is a perspective view of a paper sheet conveyance unit and its vicinity of a drying device illustrated in FIG. 1.
Figure 4:
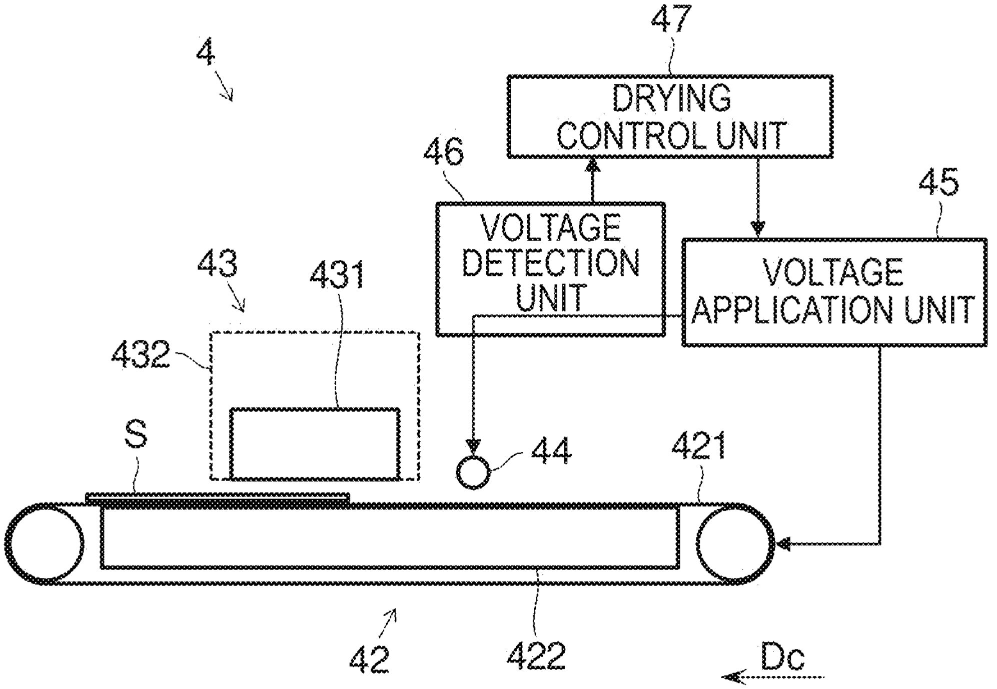
FIG. 4 is a front view of the paper sheet conveyance unit and its vicinity of the drying device illustrated in FIG. 3 and an explanatory diagram illustrating a structure of a control system.
Figure 5:
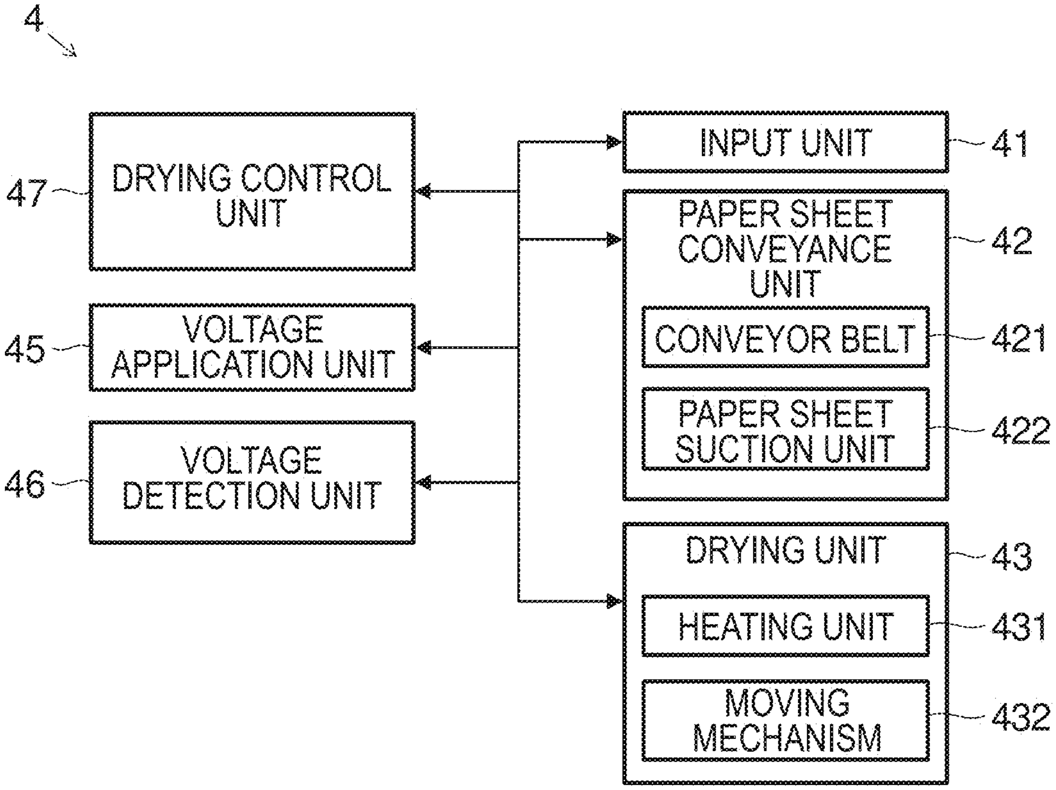
FIG. 5 is a block diagram illustrating an overall structure of the drying device illustrated in FIG. 1.
Figure 6:
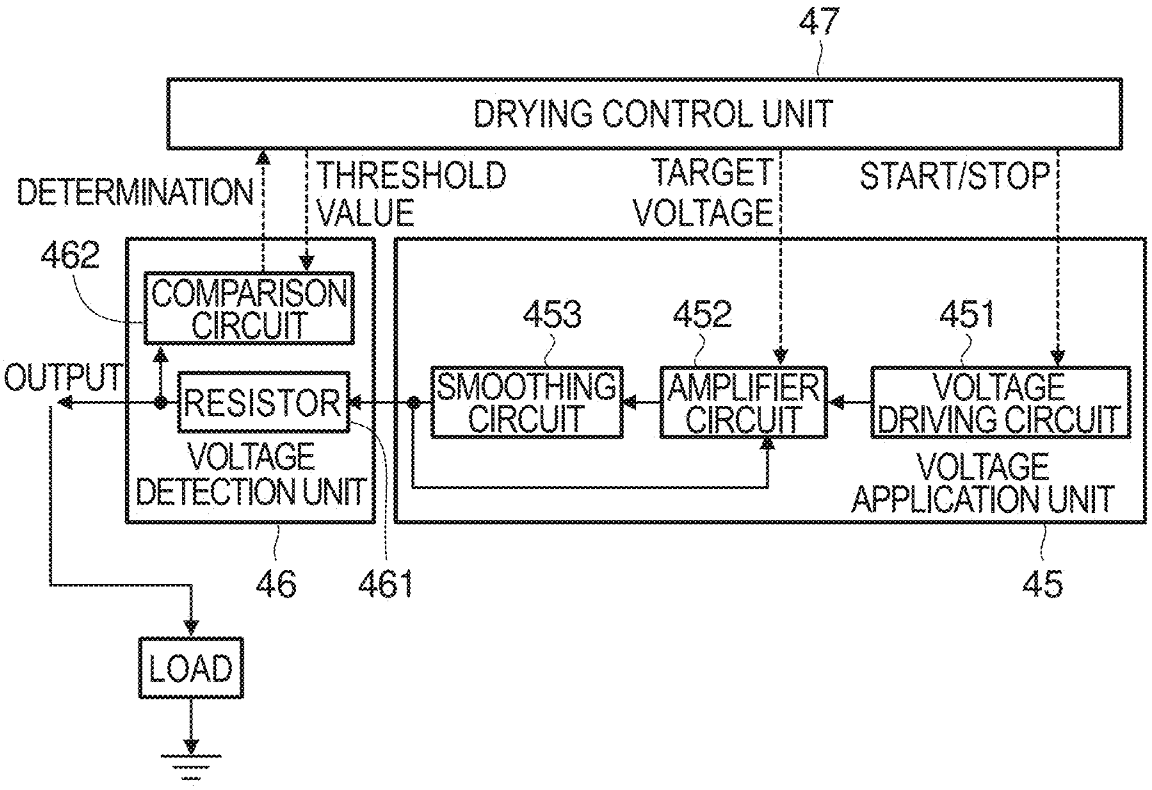
FIG. 6 is a block diagram illustrating a structure of a control system of the drying device illustrated in FIG. 4.

Next, a structure of the drying device (recording medium conveyance device) 4 is described with reference to FIGS. 3, 4, 5, and 6 in addition to FIG. 1. FIG. 3 is a perspective view of the paper sheet conveyance unit 42 and its vicinity of the drying device 4 illustrated in FIG. 1. FIG. 4 is a front view of the paper sheet conveyance unit 42 and its vicinity of the drying device 4 illustrated in FIG. 3 and an explanatory diagram illustrating a structure of a control system. FIG. 5 is a block diagram illustrating an overall structure of the drying device 4 illustrated in FIG. 1. FIG. 6 is a block diagram illustrating a structure of a control system of the drying device 4 illustrated in FIG. 4. The drying device 4 includes an input unit 41, the paper sheet conveyance unit (recording medium conveyance unit) 42, a drying unit 43, a detecting member 44, a voltage application unit 45, a voltage detection unit 46, and a drying control unit (control unit) 47.

The input unit 41 externally receives record information about image recording on the paper sheet S. This record information includes a type of the paper sheet S to be used for the image recording and information about the image to be recorded on the paper sheet S. The information about the image to be recorded on the paper sheet S includes information about a discharge amount of ink to be ejected by the image forming apparatus 3 to the paper sheet S, for example.

The input unit 41 may be like an operation panel provided to a main body of the drying device 4, for example, which receives the record information when a user makes an input operation. In addition, the input unit 41 may be like a connection terminal section such as a communication interface, for example, which receives the record information from the recording control unit 33 of the image forming apparatus 3 or from the paper sheet feeding device 2. The drying control unit 47 acquires the record information about the image recording on the paper sheet S via the input unit 41.

The paper sheet conveyance unit 42 includes an endlessly formed conveyor belt 421 and a paper sheet suction unit 422. The conveyor belt 421 has a plurality of holes penetrating the front and back surfaces (not shown). The paper sheet suction unit 422 is disposed adjacent to the upper part of the conveyor belt 421 inside the loop of the conveyor belt 421. The upper surface of the paper sheet suction unit 422 is provided with a suction section (not shown) constituted of a plurality of holes, which suck air downward.

The paper sheet conveyance unit 42 sucks and holds the paper sheet S on the upper surface of the conveyor belt 421 by the paper sheet suction unit 422, so as to convey the same. The paper sheet conveyance unit 42 is disposed below the drying unit 43, so as to face the drying unit 43, and conveys the paper sheet S received from the image forming apparatus 3.

The drying unit 43 is disposed above the paper sheet conveyance unit 42, so as to face the paper sheet conveyance unit 42. The drying unit 43 is disposed on the downstream side of the detecting member 44 in the paper sheet conveying direction Dc. The drying unit 43 includes the heating unit 431 and a moving mechanism 432.

The heating unit 431 faces the paper sheet S that is sucked and held on the upper surface of the conveyor belt 421 and is conveyed by the same, and is disposed above the conveyor belt 421 with a predetermined interval between them. The heating unit 431 is attached to a guide member (not shown) extending in an up and down direction, and can move in the up and down direction. The heating unit 431 can be supported by the moving mechanism 432 in a vertically movable manner.

The heating unit 431 includes a heat source such as a heater for heating and drying the paper sheet S. The heating unit 431 is controlled by the drying control unit 47, so as to heat and dry the paper sheet S.

The moving mechanism 432 is disposed adjacent to the heating unit 431. The moving mechanism 432 includes, for example, a motor as a driving source, a wire connected to the heating unit, and a pulley around which the wire is wrapped so as to be rotated by the motor (which are not shown). By rotating the motor in one direction, the moving mechanism 432 allows the pulley to wind the wire, so as to move the heating unit 431 upward. In addition, by rotating the motor in the other direction, the moving mechanism 432 allows the pulley to unwind the wire, so as to move the heating unit 431 downward.

The moving mechanism 432 moves the heating unit 431 selectively between a drying position close to the conveyor belt 421 and a retracting position for retracting upward from the conveyor belt 421. In other words, the moving mechanism 432 allows the heating unit 431 to approach and separate from the paper sheet conveyance unit 42. The operation of the moving mechanism 432 is controlled by the drying control unit 47.

The detecting member 44 is disposed on an upstream side of the drying unit 43 in the paper sheet conveying direction Dc. The detecting member 44 is disposed above the paper sheet conveyance unit 42, so as to face the paper sheet conveyance unit 42 with a predetermined interval therebetween. The detecting member 44 extends over the entire region in the paper sheet width direction Dw of the conveyor belt 421.

A lower end of the detecting member 44 is positioned lower than a lower end of the heating unit 431 in the drying position with respect to the paper sheet S. The detecting member 44 is, for example, a conductive member such as metal, and is formed in a rod-like shape. The detecting member 44 is electrically connected to the voltage application unit 45.

The voltage application unit 45 is electrically connected to the detecting member 44 and the paper sheet conveyance unit 42. As illustrated in FIG. 6, the voltage application unit 45 includes a voltage driving circuit 451, an amplifier circuit 452, and a smoothing circuit 453.

The voltage driving circuit 451 includes a transistor and the like, for example, and outputs an AC drive voltage to the amplifier circuit 452. The amplifier circuit 452 includes a transistor and the like, for example, amplifies the drive voltage output from the voltage driving circuit 451, and outputs the same to the smoothing circuit 453. The smoothing circuit 453 includes a diode, a resistor, a capacitor, and the like, for example, smooths the drive voltage amplified by the amplifier circuit 452, and outputs a high DC voltage (e.g., a few kV).

The voltage application unit 45 outputs the high DC voltage as a detection voltage for detecting a rise of the paper sheet S to the detecting member 44. In other words, the voltage application unit 45 applies the detection voltage between the detecting member 44 and the paper sheet conveyance unit 42. The drying control unit 47 controls to start and stop the voltage application unit 45, and performs a constant voltage control of the detection voltage, so that it becomes constant with respect to a target voltage.

The voltage detection unit 46 receives the detection voltage output from the voltage application unit 45. As illustrated in FIG. 6, the voltage detection unit 46 includes a resistor 461 connected to the output of the voltage application unit 45, and a comparison circuit 462 of the detection voltage. The comparison circuit 462 is applied with a threshold value for the detection voltage from the drying control unit 47. The threshold value for the detection voltage is a voltage value for determining whether or not the paper sheet S has contacted the detecting member 44.

Information of a detection result of the detection voltage using the threshold value, i.e., a determination result whether or not the paper sheet S has contacted the detecting member 44 is output to the drying control unit 47. In other words, the drying control unit 47 inputs the threshold value for the detection voltage to the comparison circuit 462, and receives the information of the determination result of the detection voltage from the comparison circuit 462. When the voltage application unit 45 applies the detection voltage to the detecting member 44, the voltage detection unit 46 detects a change in the detection voltage between the detecting member 44 and the paper sheet conveyance unit 42.

The drying control unit 47 includes a CPU, a storage unit, and other electronic circuits and components (which are not shown). The drying control unit 47 is communicably connected to the recording control unit 33 of the image forming apparatus 3. The drying control unit 47 receives an instruction from the recording control unit 33 and controls operations of components of the drying device 4, using the CPU on the basis of on the basis of the control program and data stored in the storage unit, so as to perform processing related to functions of the drying device 4. The paper sheet conveyance unit 42 and the drying unit 43 separately receive instructions from the drying control unit 47, and work synchronously to dry the paper sheet S. The storage unit is constituted of, for example, a combination of a nonvolatile storage device such as a program read only memory (ROM) and a data ROM, and a volatile storage device such as a random access memory (RAM).

Note that the function of the drying control unit (control unit) 47 may be owned by the recording control unit 33 of the image forming apparatus 3.

Further, when the paper sheet conveyance unit 42 conveys the paper sheet S, the drying control unit 47 controls the voltage application unit 45 to apply the detection voltage for detecting a rise of the paper sheet S. The paper sheet S and the conveyor belt 421 have high resistance values, but allow a very small current to flow when a high voltage is applied. In this way, when the paper sheet S contacts the detecting member 44, current flows, and due to voltage division by a resistance of the resistor 461 in the voltage detection unit 46 and a resistance of the conveyor belt 421 and the paper sheet S as a load, the voltage detection unit 46 can detect a change in the detection voltage.

In this embodiment, when the paper sheet S does not contact the detecting member 44, it is a state with no load, while when the paper sheet S contacts the detecting member 44, it is a state with the load constituted of the paper sheet S and the conveyor belt 421. When the load occurs, current flows in the voltage detection unit 46, and the drying control unit 47 controls the comparison circuit 462 to compare whether or not the detection voltage is lower than the threshold value due to a voltage drop generated by the resistor 461. In other words, the drying control unit 47 detects contact between the paper sheet S and the detecting member 44 on the basis of a change in the detection voltage with respect to a predetermined threshold value. In this way, the drying control unit 47 determines conveyance abnormality of the paper sheet S.

With the structure described above, the drying device 4 detects contact between the paper sheet S and the detecting member 44 on the basis of a change in the detection voltage applied to the detecting member 44. This structure can be applied to high temperature environment only by providing a metal rod-like member, for example, as the detecting member 44 for recognizing a voltage change, and it can be a small and simple structure. In this way, it is possible to determine conveyance abnormality due to a rise of the paper sheet S such as curling or bending.

In addition, the drying device 4 includes the heating unit 431 for the paper sheet S, which is disposed on the downstream side of the detecting member 44 in the paper sheet conveying direction Dc. According to this structure, if a conveyance abnormality such as a rise occurs in the paper sheet S, it is possible to determine the conveyance abnormality before the paper sheet S reaches below the heating unit 431. In this way, for example, it is possible to prevent the paper sheet S from contacting the heating unit 431 at high temperature. Therefore, it is possible to prevent a thermal damage to the paper sheet S after printing.

Figure 7:
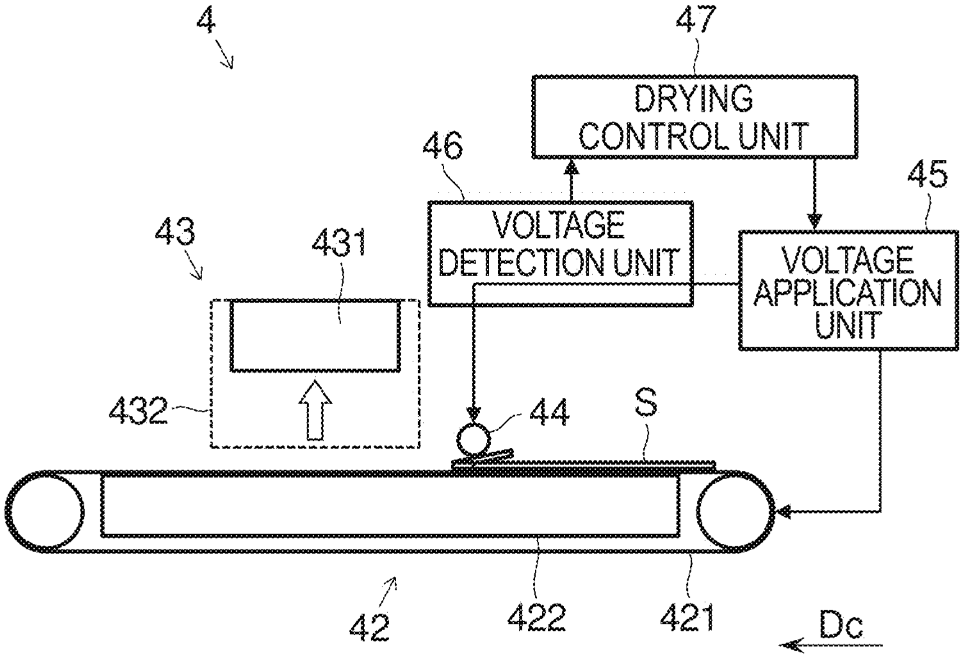
FIG. 7 is a front view of the paper sheet conveyance unit and its vicinity of the drying device illustrated in FIG. 3 and an explanatory diagram illustrating a structure of a control system, and is a diagram illustrating a state where a paper sheet with a rise is detected.

FIG. 7 is an explanatory diagram illustrating a front view of the paper sheet conveyance unit 42 and its vicinity of the drying device 4 illustrated in FIG. 3 and a structure of a control system, and is a diagram illustrating a state where the paper sheet S with a rise is detected. If the contact between the paper sheet S and the detecting member 44 is detected, the drying control unit 47 separates the heating unit 431 from the paper sheet conveyance unit 42, using the moving mechanism 432, for example. In other words, the drying control unit 47 controls the moving mechanism 432 to move the heating unit 431 upward from the conveyor belt 421 to the retracting position.

With the structure described above, by separating the heating unit 431 from the paper sheet S with a rise, it is possible to prevent the paper sheet S from contacting the heating unit 431 at high temperature. Therefore, it is possible to prevent a thermal damage to the paper sheet S after printing.

In addition, if the contact between the paper sheet S and the detecting member 44 is detected, the drying control unit 47 may stop conveying the paper sheet S by the paper sheet conveyance unit 42. According to this structure, by preventing the paper sheet S with a rise from entering below the heating unit 431, it is possible to prevent the paper sheet S from contacting the heating unit 431 at high temperature. Therefore, it is possible to prevent a thermal damage to the paper sheet S after printing.

In addition, if the contact between the paper sheet S and the detecting member 44 is detected, the drying control unit 47 may stop heating the paper sheet S by the heating unit 431. According to this structure, it is possible to decrease temperature of the heating unit 431 before the paper sheet S with a rise reaches the heating unit 431. Therefore, it is possible to prevent a thermal damage to the paper sheet S after printing.

In addition, the resistance value of the paper sheet S changes depending on a type of the paper sheet or a discharge amount of ink ejected to the paper sheet S. The drying control unit 47 acquires the record information such as a type of the paper sheet and a discharge amount of ink to be ejected to the paper sheet S, via the input unit 41. The drying control unit 47 changes the detection voltage and the threshold value on the basis of the record information acquired via the input unit 41.

With the structure described above, the drying control unit 47 can acquire an appropriate value of the resistance value of the paper sheet S, which changes depending on a type of the paper sheet or a discharge amount of ink ejected to the paper sheet S. In this way, it is possible to appropriately determine whether or not the paper sheet S has contacted the detecting member 44. In other words, the effect of preventing the paper sheet S from contacting the heating unit 431 can be enhanced.

Figure 8:
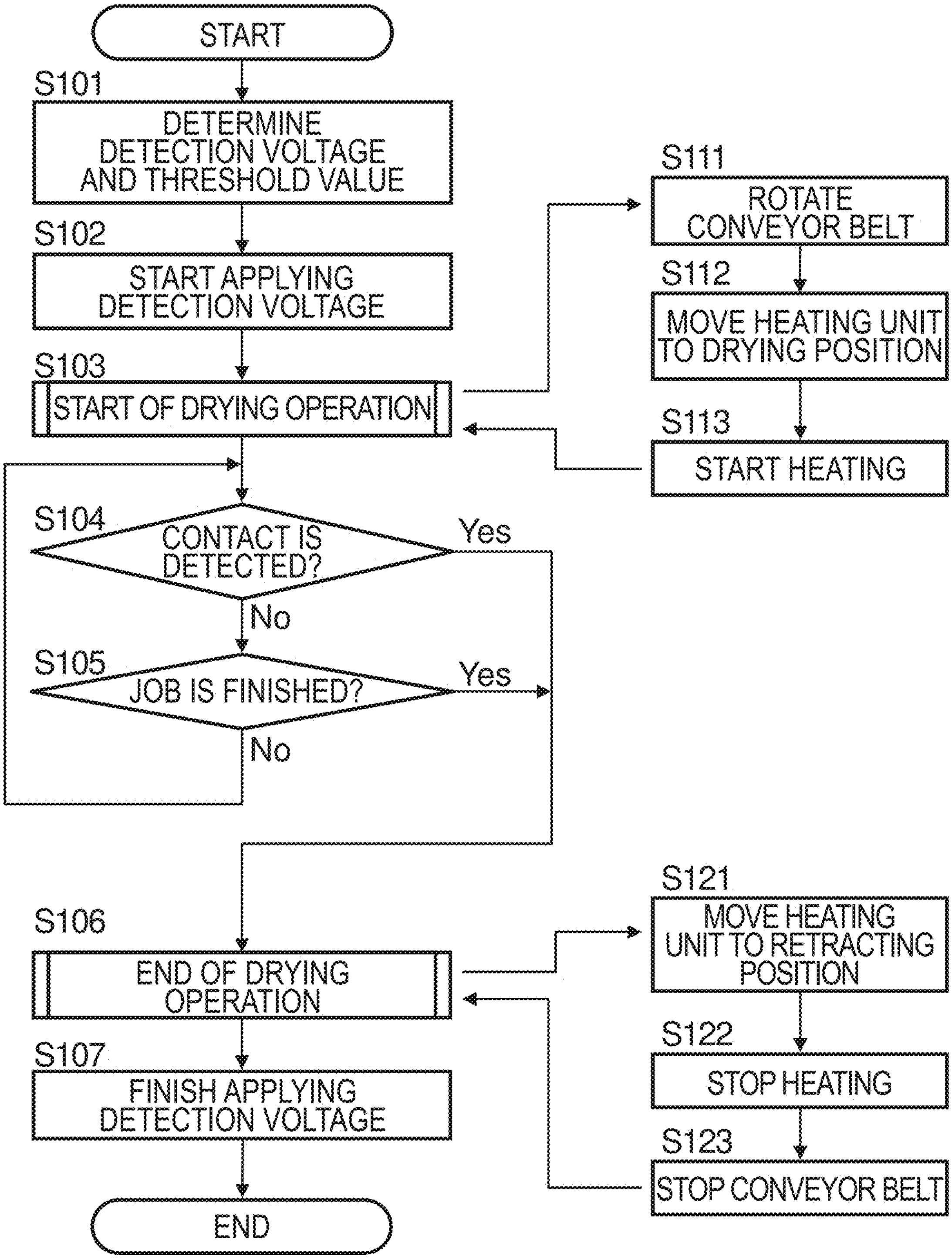
FIG. 8 is a flowchart illustrating a processing example of a drying operation in the drying device illustrated in FIG. 1.

Next, a flow of the drying operation in the drying device 4 is described. FIG. 8 is a flowchart of a processing example of the drying operation in the drying device 4 illustrated in FIG. 1.

When the drying device 4 receives a job to dry the paper sheet S ("START" in FIG. 8), the drying control unit 47 determines the detection voltage and the threshold value for detecting a rise or the like of the paper sheet S (Step S101). The drying control unit 47 determines the detection voltage and the threshold value on the basis of the record information acquired via the input unit 41.

Next, the drying control unit 47 controls the voltage application unit 45 to apply the detection voltage between the paper sheet S and the detecting member 44 (Step S102).

Next, the drying control unit 47 starts the drying operation (Step S103). When starting the drying operation, the drying control unit 47 rotates the conveyor belt 421 (Step S111), so as to start conveying the paper sheet S received from the image forming apparatus 3. Next, the drying control unit 47 controls the moving mechanism 432 to move the heating unit 431 downward, so as to move the heating unit 431 to the drying position (Step S112). Next, the drying control unit 47 turns on power to the heating unit 431, so as to start heating and drying the paper sheet S by the heating unit 431 (Step S113).

Next, the drying control unit 47 uses the voltage detection unit 46 to determine whether or not the paper sheet S has contacted the detecting member 44, on the basis of a change in the detection voltage with respect to the predetermined threshold value (Step S104). If the paper sheet S has not contacted the detecting member 44 (No in Step S104), the process proceeds to Step S105. If the paper sheet S has contacted the detecting member 44 (Yes in Step S104), the process proceeds to Step S106.

If the paper sheet S has not contacted the detecting member 44, the drying control unit 47 determines whether or not the job is finished (Step S105). If the job is not finished yet (No in Step S105), the process returns to Step S104, and the conveyance of the paper sheet S and the determination of contact between the paper sheet S and the detecting member 44 are continued. If the job is finished (Yes in Step S105), the process proceeds to Step S106.

If the paper sheet S has contacted the detecting member 44, or if the job is finished, the drying control unit 47 finishes the drying operation (Step S106). When finishing the drying operation, the drying control unit 47 controls the moving mechanism 432 to move the heating unit 431 upward, so as to move the heating unit 431 to the retracting position (Step S121). Next, the drying control unit 47 turns off power to the heating unit 431, so as to stop heating and drying the paper sheet S by the heating unit 431 (Step S122). Next, the drying control unit 47 stops rotation of the conveyor belt 421 (Step S123), so as to stop the conveyance of the paper sheet S.

Next, the drying control unit 47 controls the voltage application unit 45 to stop application of the detection voltage (Step S107). Then, the drying control unit 47 finishes the processing related to FIG. 8.

Figure 9:
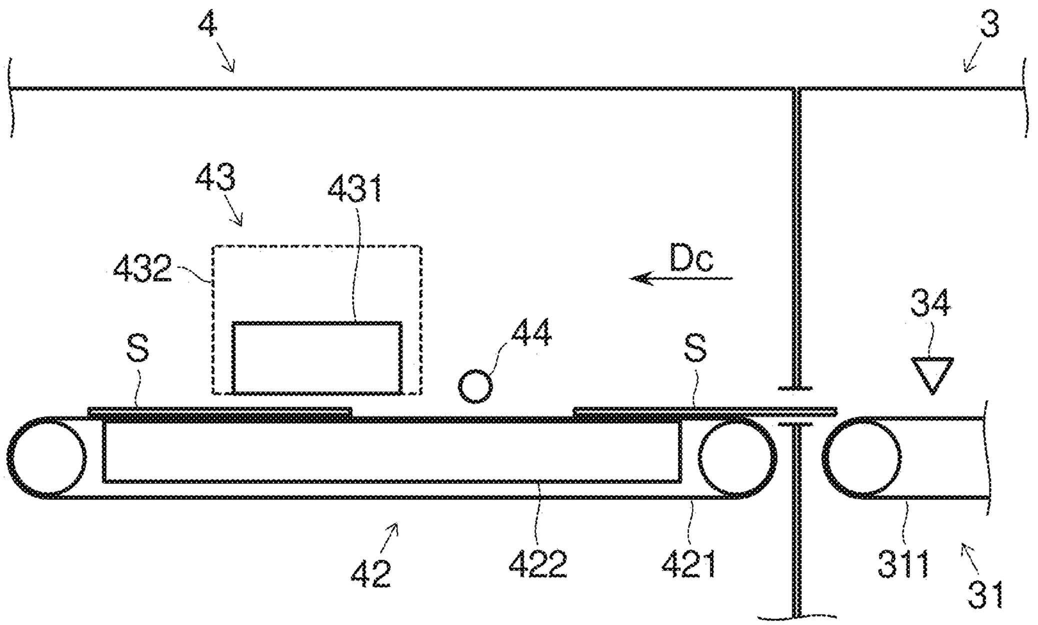
FIG. 9 is a schematic cross-sectional partial front view of the image forming system according to a variation.
Figure 10:
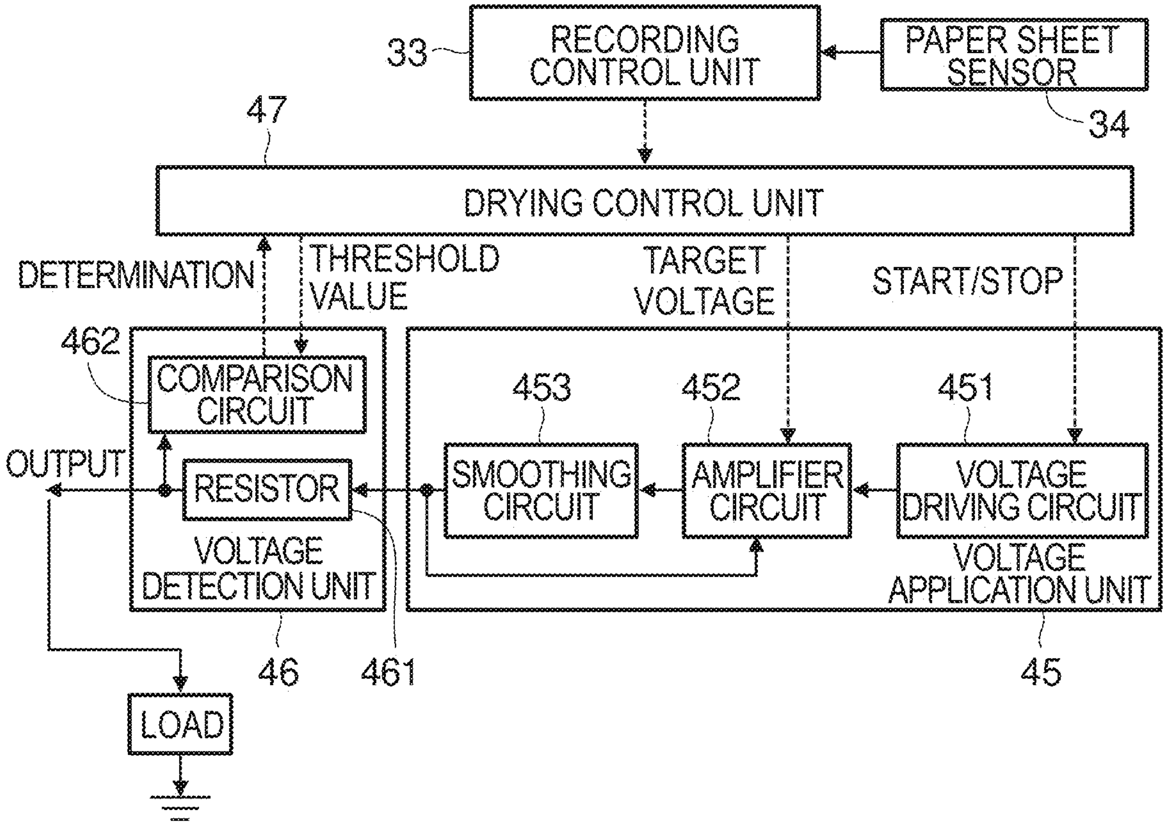
FIG. 10 is a block diagram illustrating a structure of a control system of the drying device and the image forming apparatus illustrated in FIG. 9.

FIG. 9 is a schematic cross-sectional partial front view of the image forming system 1 according to a variation. FIG. 10 is a block diagram illustrating a structure of a control system of the image forming apparatus 3 and the drying device 4 illustrated in FIG. 9. As illustrated in FIGS. 9 and 10 as the variation, the image forming apparatus 3 includes a paper sheet sensor (recording medium detection unit) 34.

The paper sheet sensor 34 is disposed on the downstream side of the recording unit 32 (see FIG. 1) in the paper sheet conveying direction Dc, above the belt conveyance unit 31. The paper sheet sensor 34 is a sensor for detecting a position of the paper sheet S conveyed by the belt conveyance unit 31 in the paper sheet conveying direction Dc. In other words, the paper sheet sensor 34 detects passing of the paper sheet S conveyed from the image forming apparatus 3 to the drying device 4.

The recording control unit 33 recognizes a position of the paper sheet S on the belt conveyance unit 31 on the basis of a detection signal of the paper sheet S received from the paper sheet sensor 34. In this way, information about position of the paper sheet S conveyed from the image forming apparatus 3 to the drying device 4 is sent from the recording control unit 33 of the image forming apparatus 3 to the drying control unit 47 of the drying device 4.

Further, the drying control unit 47 determines whether or not the paper sheet S faces the detecting member 44, on the basis of conveying speed of the paper sheet S, detection timing of the paper sheet S by the paper sheet sensor 34, and distance from the paper sheet sensor 34 to the detecting member 44. By recognizing whether or not the paper sheet S faces the detecting member 44, it is possible to improve detection accuracy of the contact between the paper sheet S and the detecting member 44. In this way, when the drying device 4 heats and dries the paper sheet S, safety can be enhanced.

In addition, when the image forming apparatus 3 performs continuous printing, i.e., continuously prints images on a plurality of the paper sheets S, the drying control unit 47 determines whether the paper sheet S faces the detecting member 44 or a space (an interval) between the successive paper sheets S faces the detecting member 44. This determination is performed, as described above, on the basis of the conveying speed of the paper sheet S, the detection timing of the paper sheet S by the paper sheet sensor 34, and the distance from the paper sheet sensor 34 to the detecting member 44.

Further, when a space (an interval) between the successive paper sheets S faces the detecting member 44, the drying control unit 47 changes the detection voltage and the threshold value for detecting a rise of the paper sheet S, on the basis of a type of the paper sheet S that is conveyed next and information of the image to be recorded on the paper sheet S (e.g., a discharge amount of ink to be ejected to the paper sheet S).

With the structure described above, during continuous printing on the plurality of paper sheets S, if the type of the paper sheet and the ink discharge amount change for each paper sheet, it is possible to change the detection voltage and the threshold value to appropriate values. In this way, it is possible to appropriately determine whether or not the paper sheet S has contacted the detecting member 44. In other words, the effect of preventing the paper sheet S from contacting the heating unit 431 can be enhanced.

Figure 11:
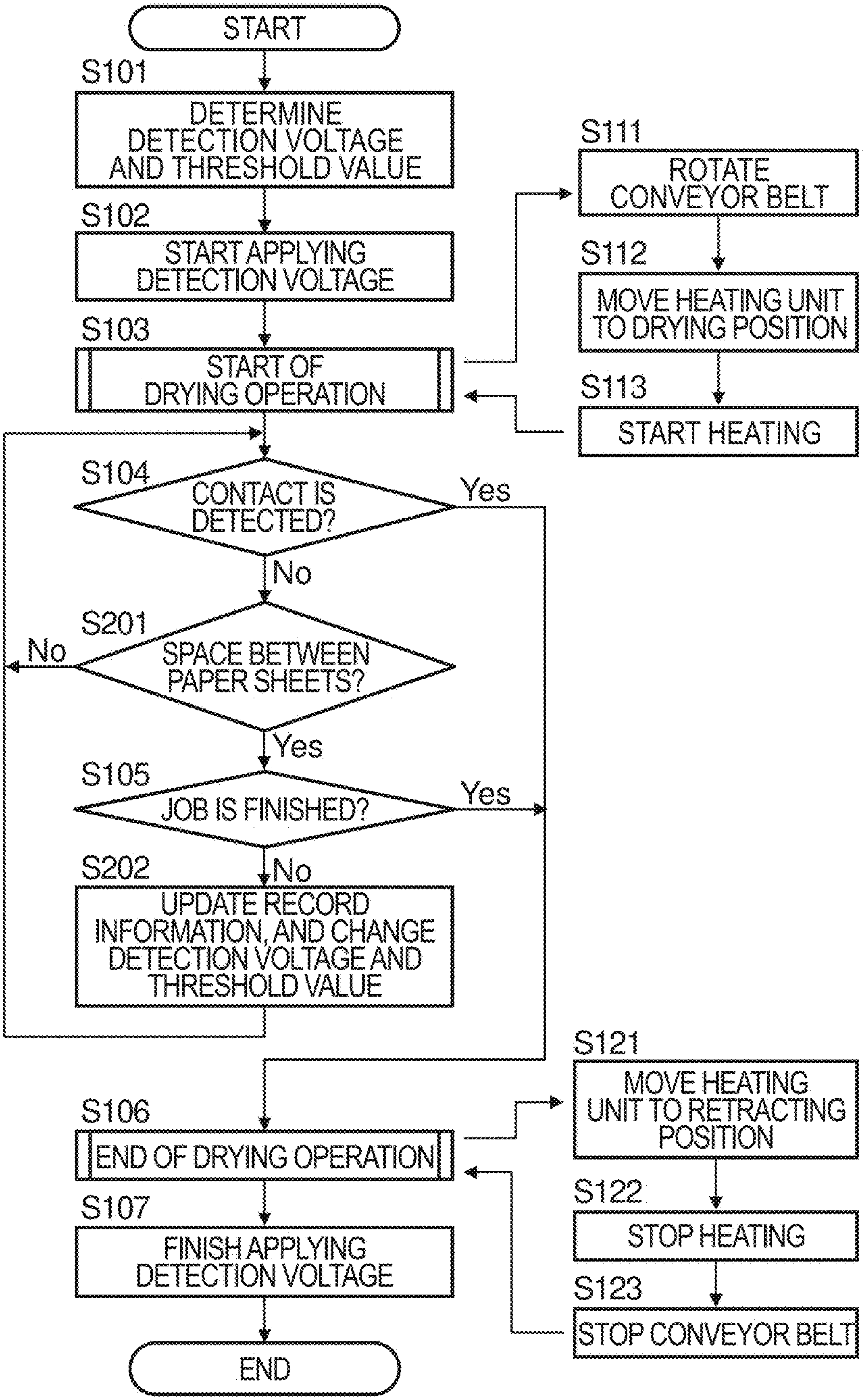
FIG. 11 is a flowchart illustrating a processing example of the drying operation in the drying device illustrated in FIG. 9.

Next, a flow of the drying operation in the drying device 4 of the variation is described. FIG. 11 is a flowchart of the processing example of the drying operation in the drying device 4 illustrated in FIG. 9. Note that in the processing example of FIG. 11, the same step as in the processing example of FIG. 8 described above is denoted by the same step number, and description thereof is omitted.

In Step S104 of FIG. 11, the drying control unit 47 determines whether or not the paper sheet S has contacted the detecting member 44, on the basis of a change in the detection voltage with respect to the predetermined threshold value using the voltage detection unit 46. If the paper sheet S has not contacted the detecting member 44 (No in Step S104), the process proceeds to Step S201. If the paper sheet S has contacted the detecting member 44 (Yes in Step S104), the process proceeds to Step S106.

If the paper sheet S has not contacted the detecting member 44, the drying control unit 47 determines whether or not a space (an interval) between the successive paper sheets S faces the detecting member 44 (Step S201). If a space between the paper sheets does not face the detecting member 44 (No in Step S201), the process returns to Step S104, and the conveyance of the paper sheet S and the determination of contact between the paper sheet S and the detecting member 44 are continued. If a space between the paper sheets faces the detecting member 44 (Yes in Step S201), the process proceeds to Step S105.

If a space between the paper sheets faces the detecting member 44, the drying control unit 47 determines whether or not the job is finished (Step S105). If the job is not finished yet (No in Step S105), the process proceeds to Step S202. If the job is finished (Yes in Step S105), the process proceeds to Step S106.

If the job is not finished yet, the drying control unit 47 acquires new record information via the input unit 41, updates the record information so as to change the detection voltage and the threshold value (Step S202). For instance, if the type of the paper sheet and the ink discharge amount have changed for each paper sheet, the drying control unit 47 changes the detection voltage and the threshold value to appropriate values that fit to the changed type of the paper sheet and ink discharge amount.

When the processing of Step S202 is finished, the drying control unit 47 returns to Step S104, and continues the conveyance of the paper sheet S and the determination of contact between the paper sheet S and the detecting member 44.

Although the embodiment of the present disclosure is described above, the scope of the present disclosure is not limited to the embodiment, which can be variously modified for implementation within the scope of the present disclosure without deviating from the spirit thereof.

For instance, it may be possible to dispose another detecting member equivalent to the detecting member 44 of the drying device 4, on the upstream side of the recording unit 32 of the image forming apparatus 3 in the paper sheet conveying direction Dc. According to this structure, when conveyance abnormality such as a rise occurs in the paper sheet S, it is possible to determine the conveyance abnormality before the paper sheet S reaches below the recording head 322. In this way, for example, it is possible to prevent the paper sheet S from contacting an ink ejection surface of the recording head 322. Therefore, it is possible to prevent a damage to the ink ejection surface of the recording head 322.

What is claimed is:

1. A recording medium conveyance device comprising:

a recording medium conveyance unit configured to convey at least one recording medium;

a detecting member disposed to face the recording medium conveyance unit with a predetermined interval therebetween;

a voltage application unit configured to apply a detection voltage between the recording medium conveyance unit and the detecting member; and a control unit configured to control the recording medium conveyance unit and the voltage application unit, wherein when the recording medium conveyance unit conveys the at least one recording medium, the control unit controls the voltage application unit to apply the detection voltage, detects contact between the at least one recording medium and the detecting member on the basis of a change in the detection voltage with respect to a predetermined threshold value, and determines conveyance abnormality of the at least one recording medium.

2. The recording medium conveyance device according to claim 1, further comprising a heating unit disposed to face the recording medium conveyance unit on a downstream side of the detecting member in a conveying direction of the at least one recording medium, so as to heat and dry the at least one recording medium.

3. The recording medium conveyance device according to claim 2, wherein when detecting contact between the at least one recording medium and the detecting member, the control unit stops heating the at least one recording medium by the heating unit.

4. The recording medium conveyance device according to claim 2, further comprising a moving mechanism configured to allow the heating unit to approach or separate from the recording medium conveyance unit, wherein when detecting contact between the at least one recording medium and the detecting member, the control unit controls the moving mechanism to separate the heating unit from the recording medium conveyance unit.

5. The recording medium conveyance device according to claim 1, wherein when detecting contact between the at least one recording medium and the detecting member, the control unit stops conveyance of the at least one recording medium by the recording medium conveyance unit.

6. The recording medium conveyance device according to claim 1, further comprising an input unit configured to receive record information including a type of the at least one recording medium to be used for recording an image and information about the image to be recorded on the at least one recording medium, wherein the control unit changes the detection voltage and the threshold value on the basis of the record information.

7. The recording medium conveyance device according to claim 6, wherein the at least one recording medium comprises a plurality of successive recording media, and the control unit changes the detection voltage and the threshold value, on the basis of the record information, during continuous recording on the plurality of successive recording media.

8. An image forming system comprising:

an image forming apparatus configured to record an image on at least one recording medium; and the recording medium conveyance device according to claim 1, connected to a downstream side of the image forming apparatus in a conveying direction of the at least one recording medium.

9. The image forming system according to claim 8, further comprising a recording medium detection unit configured to detect passing of the at least one recording medium conveyed from the image forming apparatus to the recording medium conveyance device, wherein the control unit determines whether or not the at least one recording medium faces the detecting member, on the basis of conveying speed of the at least one recording medium, detection timing of the recording medium detection unit, and distance from the recording medium detection unit to the detecting member.

10. The image forming system according to claim 9, wherein the at least one recording medium comprises a plurality of successive recording media, when the image forming apparatus continuously records the image on each of the plurality of successive recording media, the control unit determines whether one of the plurality of successive recording media faces the detecting member or an interval between the plurality of successive recording media faces the detecting member, on the basis of conveying speed of the plurality of successive recording media, detection timing of the recording medium detection unit, and distance from the recording medium detection unit to the detecting member, and if the interval between the plurality of successive recording media faces the detecting member, the control unit changes the detection voltage and the threshold value, on the basis of a type of, of the plurality of successive recording media, one to be conveyed next and information of the image to be recorded on the one of the plurality of successive recording media.

* * * * *